United States Patent [19]

Gross

[11] 4,057,162
[45] Nov. 8, 1977

[54] PRESSURE VESSEL FOR NUCLEAR REACTOR

[75] Inventor: Heiko Gross, Krefeld, Germany

[73] Assignee: Siempelkamp Giesserei KG, Krefeld, Germany

[21] Appl. No.: 638,075

[22] Filed: Dec. 5, 1975

[30] Foreign Application Priority Data

Dec. 6, 1974 Germany .............................. 2457661

[51] Int. Cl.² ............................................ B65D 45/32
[52] U.S. Cl. .................................... 220/3; 52/223 R;
   52/586; 176/87; 220/71; 220/328; 292/256.6
[58] Field of Search ....................... 220/3, 71, 73, 327,
    220/328; 52/223 R, 224, 225, 586, 245, 246,
                     249; 292/256.6, 256.63; 176/87

[56] References Cited

U.S. PATENT DOCUMENTS

| 716,865 | 12/1902 | Choquet et al. ....................... 52/586 |
|---|---|---|
| 729,535 | 6/1903 | Brandner ................................ 52/586 |
| 1,189,694 | 7/1916 | Janssen et al. ......................... 52/224 |
| 2,597,084 | 5/1952 | Huddleston ............................. 52/224 |
| 3,085,366 | 4/1963 | Jamison .................................. 52/225 |
| 3,371,017 | 2/1968 | Coast et al. ............................ 52/224 |
| 3,393,820 | 7/1969 | Fuchs, Jr. ................................. 220/3 |
| 3,464,581 | 9/1969 | Polcer .................................... 220/327 |
| 3,478,920 | 11/1969 | Pechacek ................................. 220/3 |
| 3,503,171 | 3/1970 | Frohly .................................... 52/224 |
| 3,568,385 | 3/1971 | Cruset et al. ........................... 52/224 |
| 3,764,039 | 10/1973 | Jorgensen ................................ 220/3 |

Primary Examiner—William Price
Assistant Examiner—Allan N. Shoap
Attorney, Agent, or Firm—Karl F. Ross

[57] ABSTRACT

A pressure vessel, containment or burst shield for a nuclear reactor has a substantially circular cover surmounting the cylindrical part (shell) of the vessel and preferably comprised of a plurality of circular segments arranged concentrically and stressed inwardly by annular prestressing means. At least the outer segments and preferably all of the segments are provided on the upper surface with upwardly open circular grooves receiving the prestressing arrangement. The latter can comprise an outwardly open channel-shaped (U-section) supporting member receiving the stressing cables and means for transferring the radial stress of the annular stressing arrangement to the ring segment. The latter means may be wedges inserted between the support and a wall of the groove after the stressing arrangement has been placed under stress, e.g. by hydraulic means for spreading the annular stressing arrangement.

6 Claims, 6 Drawing Figures

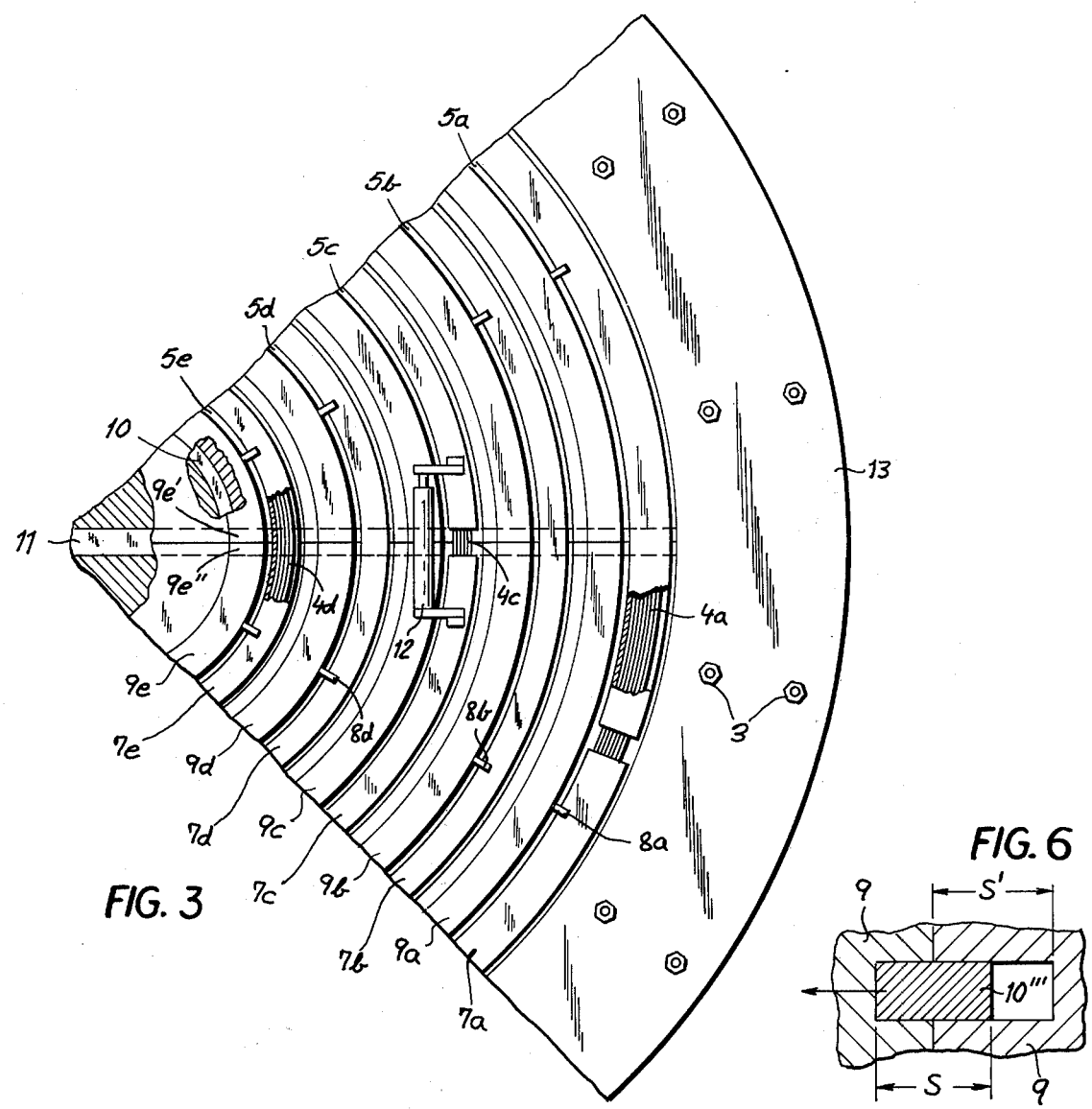
FIG. 3
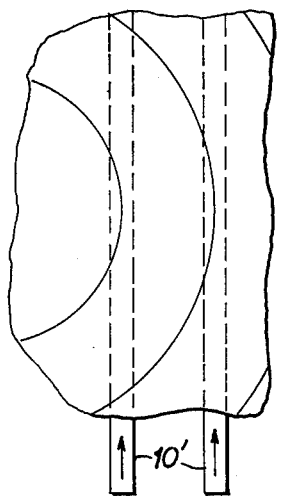
FIG. 4
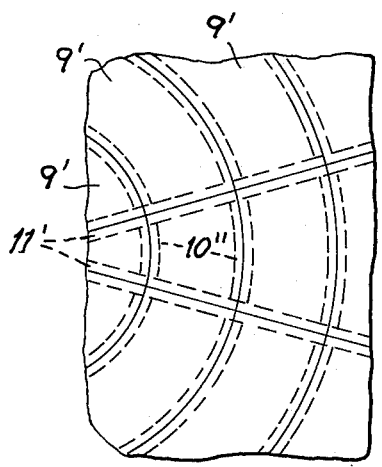
FIG. 5
FIG. 6

PRESSURE VESSEL FOR NUCLEAR REACTOR

CROSS-REFERENCE TO RELATED APPLICATIONS

This application is related to the commonly assigned copending application Ser. No. 586,601, now abandoned filed by Franz SCHILLING and Burkhard BEINE for a "METHOD OF MOUNTED A LINER IN A BURST SHIELD OF A PRESSURIZED REACTOR" and to commonly assigned copending application Ser. No. 569,157, filed Apr. 18, 1975 by Burkhard BEINE and Franz SCHILLING entitled "BURST SHIELD CONTAINMENT FOR NUCLEAR REACTOR AND METHOD OF OPERATING SAME". These applications also make reference to the commonly assigned applications Ser. Nos. 441,491 and 441,492 of Feb. 11, 1974 (now U.S. Pat. Nos. 3,963,565 and 3,963,563 respectively).

FIELD OF THE INVENTION

The present invention relates to a pressurizable vessel and, more particularly, to a pressure vessel for a nuclear reactor, e.g. a vessel of the type described in the aforementioned applications which may be fitted with a liner and may receive the core of a pressurized-water or other type of nuclear reactor core. Such vessels have also been termed "containments" and "burst shields" since they act to confine the products of a breakdown of the reactor or leakage therefrom.

The pressurized vessel may, as described in the aforementioned applications, be assembled from circular segments which are disposed coaxially, are composed of cast iron or other cast material of high strength, and are prestressed to resist outwardly directed forces.

Particularly, the present system is concerned with the covers of such reactors.

BACKGROUND OF THE INVENTION

In the past it has been proposed to provide the cover of a pressurizable vessel for a nuclear reactor of the type described above, which is adapted to surmount a cylindrical prestressed structure, with annular prestressing by cables extending circumferentially around the outer periphery or rim of the disk-shaped cover member. Annular prestressing in this sense denotes the application of a radially inward force upon the body of the cover as generated by a tension cable or cable assembly bearing inwardly on an annular surface of the structure.

It has been found that such prior-art cover-prestressing systems are disadvantageous in some respects, since the application of the prestress to the outer periphery of a large-diameter disk-shaped body does not provide a uniform prestressing force at interior points of the disk. It has been found to be impossible with such systems, for example, to establish a predetermined measurable inward prestress at any particular region of the cover inwardly of the periphery at which the cables acted. The application of numerically uniform predetermined prestressing forces at substantially all points or regions of the cover has been found to be particularly necessary for prestressed pressurized vessels of the pod-boiler type.

OBJECTS OF THE INVENTION

It is the principal object of the present invention to provide an improved pressurizable vessel for a nuclear reactor whereby the disadvantages of earlier systems can be avoided.

Another object of this invention is to provide an improved cover structure for a pressurized vessel.

It is also an object of the invention to provide a system whereby a predetermined prestress can be applied to substantially any region of a disk-shaped cover for a nuclear reactor vessel.

Still another object of the invention is to provide a cover for a pressurizable vessel for a nuclear reactor in which prestressing forces can be distributed more uniformly or more controllably than hitherto has been the case.

SUMMARY OF THE INVENTION

These objects are attained, in accordance with the present invention, with a pressurizable vessel, especially for a nuclear reactor as described in any of the aforementioned applications, which comprises a cover (preferably of circular configuration) formed along its upper portion with at least two radially spaced annular grooves or recesses receiving respective annular prestressing arrangements each including at least one cable bearing inwardly and in force-transmitting relationship with a wall of the groove to apply radially inwardly directed forces thereto.

This arrangement allows the prestressing cables to apply annular prestress uniformly concentrically over the cover and hence distributes the annular prestress thereover. The radial prestress can be set independently of the radius, i.e. the distance of the prestressing arrangement from the center, and permits the prestressing of the cover to be set at values which may be necessary to counteract the expected or predictable loading. Of course, the internal annular prestressing arrangements described above can be provided in addition to a conventional peripheral prestressing cable or arrangement as is conventional in the art.

Preferably the prestressing cable or cables for each groove are received within the channel of a U-section or channel-shaped annular supporting body received in the groove and opening outwardly, with the bight or web of that body bearing on a wall of the groove which is parallel to the axis of the cover. The supporting body and the cables together may form the annular prestressing arrangement and can be inserted together into the annular groove after having been prefabricated elsewhere. The supporting element may be spread radially by a hydraulic device to apply the desired degree of stress to the cables and the inwardly directed forces resulting from the stressing of the cables can be transmitted to the wall of the groove by force-transmitting elements, e.g. wedges, driven between the support element and the groove wall to maintain the prestress.

While the system of the present invention is suitable for use with a single-piece cover, i.e. a cover cast in a single operation. I have found it to be desirable to make the cover from a plurality of concentric ring segments, each of which is formed with at least one such groove and prestressing arrangement; the ring has adjacent segments bearing upon one another. The ring segment may be coupled together with form-fitting elements such as keys orthogonal to the axis of the pressurizable vessel.

BRIEF DESCRIPTION OF THE DRAWING

The above and other objects, features and advantages of the present invention will become more readily apparent from the following description, reference being made to the accompanying drawing in which:

FIG. 3 is a plan view of the cover drawn to a smaller scale;

FIGS. 4 and 5 are fragmentary diagrammatic bottom views illustrating features of the invention; and FIG. 6 is a fragmentary sectional view illustrating one of the concepts involved in the present invention.

SPECIFIC DESCRIPTION

Figure 1:
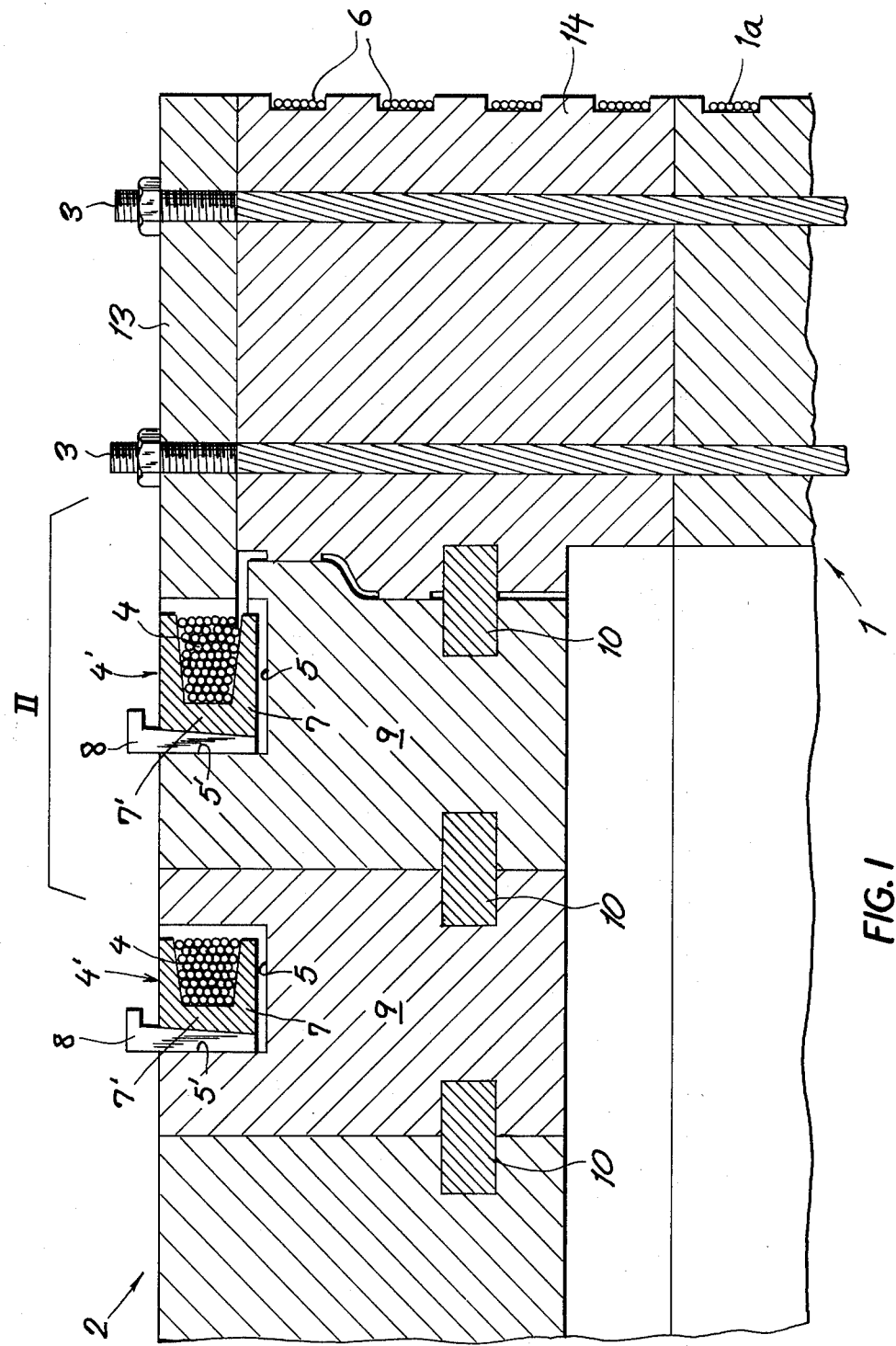
FIG. 1 is a cross-sectional view through a portion of a pressurizable vessel embodying the invention.

The overall configuration of a pressure vessel in accordance with the present invention can correspond to those of the aforementioned applications except that the cover structure thereof should correspond to that illustrated in the drawing hereof and described below.

Figure 2:
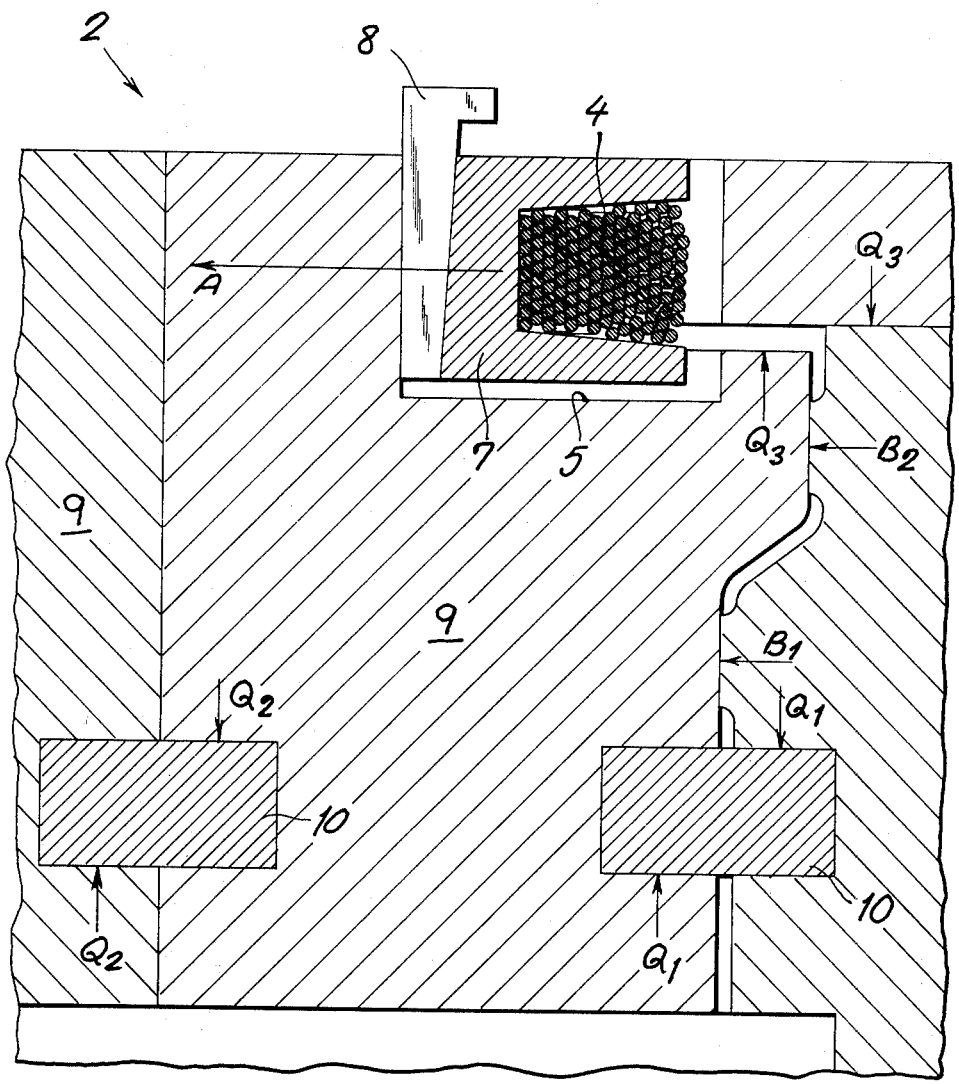
FIG. 2 is a detail view, drawn to an enlarged scale, of the portion of the cover of the vessel indicated at II in FIG. 1.

FIGS. 1 and 2 illustrate a portion of a nuclear reactor pressure vessel which comprises a cylindrical shell 1, which may be circumferentially prestressed by cables 1a, upon which is mounted the cover 2, the cover being held in place by connecting cables 3. The latter may traverse the outer member or ring segment 14 of the cover and can extend axially through the ring segments forming the cylindrical shell to apply an axial prestress to the system.

The cover 2 is prestressed by means of prestressing cables 4 in annular prestressing arrangement 4'. More specifically, the cover 2 is formed on its upper surface with two or more concentrically circular and endless annular grooves 5 having walls 5' defined by a generatrix parallel to the axis of the cylinder 1. The prestressing cables 4 of the respective prestressing assemblies 4' are received in these grooves. In addition, prestressing cables 6 may surround the periphery of the outer circular segment 14 of the cover to provide a conventional peripheral prestressing of the cover.

The cables 4 are received in U-section support elements 7 opening outwardly in the direction of the outer circumference of the cover. The support element lie in the respective grooves 5 and force-transmitting wedges 8 are driven between the webs 7' of the support elements and the walls 5' of the grooves to maintain the inward prestress of the cables 4 after this prestressing force has been generated by hydraulic device tending to radially spread the prestressing arrangement until the wedges 8 can be inserted.

As is especially apparent from FIG. 2, which shows a detail of the cover 2, the latter comprises a plurality of ring segments 9 held together by inward prestress. Each of the ring segments 9 defines a circumferential annular groove 5 which receives the prestressing cables 4 of a respective annular prestressing arrangement 4'. The ring elements 9 are locked together against axial movement with the aid of form-fitting keys 10 extending perpendicular to the axis of the vessel 1.

As can be seen from FIG. 2 further, the cover is exposed to traverse forces Q which may be either active or redundant. Thus, if $Q_1$ is active, $Q_3$ is a redundant force.

The prestressing forces are represented at A and, where the prestressing force A is active, the radial forces $B_2$ and $B_1$ applied upon the element having the active force are redundant. It is possible, by control of the mutual engagement of the concentric elements and the prestressing force to regulate the prestressing moment and thus the forces with which one element bears upon the other in any desired relationship. Similarly force $B_2$ can be eliminated or made active, in the latter case the cables 6 generate an active prestresses as well.

FIG. 3 shows at 12 a hydraulic device which can be charged with fluid to spread apart the ends of the split ring forming the support 7c for cables 4c of the ring 9c for a cover comprising a plurality of rings 9a – 9e each subdivided into ring segments 9e' and 9e'' for example. To support the two or more segments of each ring relative to one another, radial keys 11 can be introduced into confronting grooves as illustrated with a system of FIG. 2 for the circular keys 10. In addition, also as shown in FIG. 3, circular keys 10 are provided. Of course, the segments of the outer member 14 cannot be seen in FIG. 3 since they are covered by the continuous ring 13. In FIG. 3, moreover, the supports for the cables are represented at 7a — 7e and the cables themselves are represented at 4a – 4e. The wedges which have previously been introduced are shown at 8a, 8b, 8d and 8e, the wedges for the ring 9c having not yet been introduced.

FIG. 4 shows another possible way of keying the segments of the cover together, e.g. by the introduction of tangential keys 10' into the confronting grooves through passages formed in the rings. In the embodiment of FIG. 5, the keys which extend radially and arcuately are provided in a common plane. Thus, the radial keys 11' are continuous and extend through all of the segmented rings 9' while arc-segmental keys 10'' are provided between each segment and the neighboring segments radially inwardly and outwardly thereof.

In the embodiment of FIG. 6, the groove of the inner ring 9 has a depth S' which exceed the width S of the split spring 10''' and the latter is pressed into the groove when the two rings 9 are aligned and is permitted to spring into the confronting groove of the outer ring 9 in which it is lodged to a depth less than its width S.

I claim:

1. A pressurizable vessel, especially for a nuclear reactor, comprising:

a cylindrical shell and a cover mounted on said shell, said cover comprising at an upper side thereof at least two continuous radially spaced concentric annular grooves;

respective annular prestressing arrangements with respective prestressing cables received in said grooves, each of said arrangements comprising a U-section support element open toward the outer periphery of said cover and received in the respective groove, said element of each arrangement receiving the prestressing cables thereof;

wedges received between each element and a wall of the respective groove for maintaining the cables of the respective arrangement under a predetermined stress, said cover comprising a plurality of concentric rings each formed with at least one such groove and receiving a respective prestressing arrangement, at least some of said rings bearing inwardly upon neighboring rings, the neighboring rings being formed with confronting recesses; and keying means form-fitting in said recesses for preventing relative displacement of said rings in a direction transverse to the cover.

2. The vessel defined in claim 1, further comprising at least one additional prestressing cable the outer periphery of said cover and bearing inwardly thereon.

3. The vessel defined in claim 1 wherein each of said rings is formed from a plurality of segments, the neighboring segments of each ring being held against one another by the respective prestressing arrangement.

4. The vessel defined in claim 3 comprising further key means between neighboring segments of each ring.

5. The vessel defined in claim 4, wherein said rings are formed with an outer annular member, said cover further comprising prestressing means lying along the outer periphery of said member and bearing inwardly thereon.

6. The vessel defined in claim 5, further comprising cables extending through said shell parallel to the axis thereof and traversing said member to retain said cover on said shell and apply an axial prestress to said shell.

* * * * *